United States Patent Office 2,871,423
Patented Jan. 27, 1959

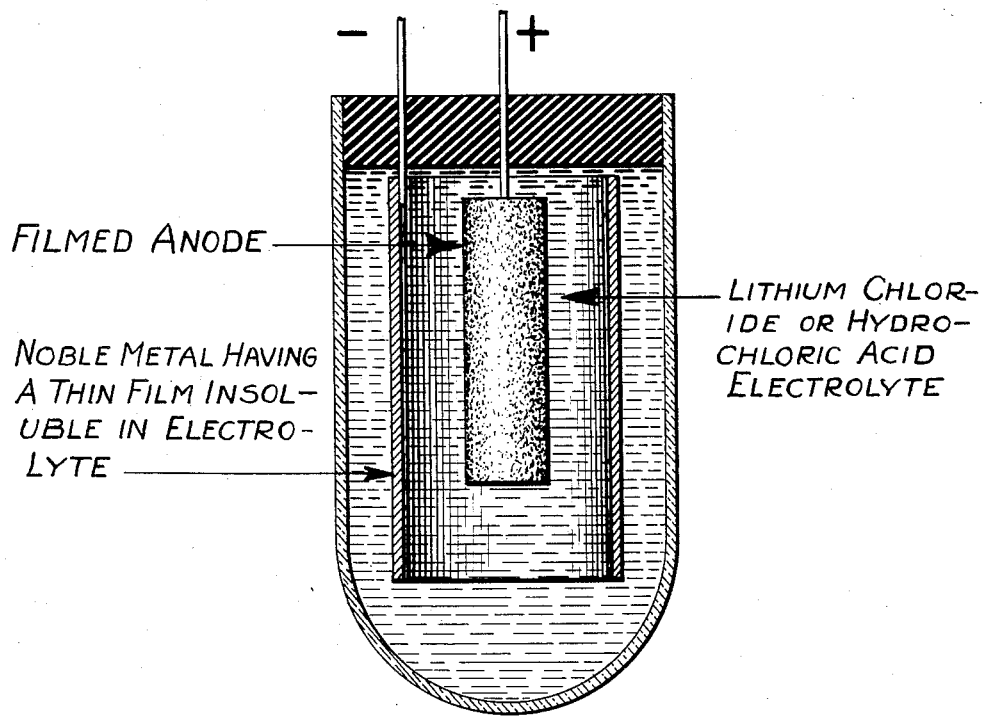

2,871,423

ELECTROLYTIC CAPACITOR

Oliver S. Aikman, Libertyville, Ill., assignor to Fansteel Metallurgical Corporation, North Chicago, Ill., a corporation of New York Application March 9, 1953, Serial No. 341,321

10 Claims. (Cl. 317—230)

This application is a continuation in part of application Serial No. 309,336, filed September 12, 1952, now abandoned.

This invention relates to an electrolytic capacitor of the polarized type having a film-forming metal as the anode, a noble metal or other metal inert to the electrolyte as the cathode, and an aqueous electrolyte principally of lithium chloride and/or hydrochloric acid.

In the electrolytic capacitor of the present invention, the anode material may be a metal or alloy having a stable asymmetrically conducting film. Thus tantalum, columbium, vanadium, antimony, bismuth, magnesium and nickel may be used as the anode. Because of the acidic nature of the electrolyte, the cathode material will be a noble metal or other metal chemically inert to the electrolyte. Such metals as silver, gold, platinum and titanium are examples of metals which may be used as cathodes in the capacitor embodying the present invention.

In a capacitor of the above type, particularly where the capacitor is sealed in a casing or container, it has been found that a phenomenon, known in the trade as "aging," deleteriously affects the performance characteristics of the capacitor. The "aging" manifests itself in the reduction of the effective value of capacitance of the capacitor and also manifests itself by increasing the effective resistance of the capacitor in a circuit. In general, "aging" results in an instability of capacitor characteristic and effectively reduces the operating life thereof.

I believe that a substantial factor in "aging" of an electrolytic capacitor of the type previously described is the direct-current leakage occurring when the capacitor is in a live circuit. When current leaks through the capacitor (the complete elimination of leakage current in an electrolytic capacitor is practically impossible), a certain amount of energy must be absorbed in the capacitor. In a capacitor as described above, the positive ions present in the electrolyte are hydrogen and lithium, if lithium chloride is present. The electrical energy absorbed or lost in the capacitor is utilized, at least in part, to dissociate hydrogen from the electrolyte, and causes the hydrogen to evolve at the cathode. Generally, the hydrogen clings to the surface of the cathode and tends to reduce the effective area thereof. The presence of hydrogen at the cathode surface causes polarization and increases the effective resistance of the capacitor and also reduces the effective area of the capacitor. While a capacitor whose electrolyte and electrodes are open to the atmosphere may not suffer so much from this phenomenon, the effect is substantial and damaging in the case of a capacitor which is hermetically sealed to the atmosphere and which is designed to operate for long periods of time either on continuous or intermittent duty.

I have discovered that this aging of the capacitor will be eliminated or at least substantially minimized by providing on the cathode surface a thin, electrically conducting stable layer or film consisting of one of a number of metallic compounds, all of which compounds include as the metal component element therein, a noble metal of the group previously referred to as usable for a cathode. Thus, these compounds may be silver chloride, the auro-auric forms of gold chloride, the same two forms of gold iodide, and the trichloride and tetrachloride of platinum.

Apparently, the thin metallic compound layer is sufficient to affect the cathode potential conditions so that substantially no hydrogen or other gas is evolved. One theory by which this action can be explained is that the compound covering the cathode raises the over-potential of cathodic gases so that during operation under normal voltage conditions there will be practically no evolution of gases at the cathode. In the case where the cathode has a chloride film, reduction of chloride salts will take place in preference to gas evolution as the silver ion is more readily discharged than the hydrogen ion. This reduction of the cathode film takes place at such a slow rate that the film can be considered, for all practical purposes, as permanent.

Another advantage resulting from the use of the above mentioned cathode films is that the cathode is wetted more fully than when the cathode is unfilmed, thereby resulting in a capacitor having a higher effective capacitance. Silver which is not coated with the above compounds, for example, is not readily wetted when used with an electrolyte such as dilute lithium chloride. This poor wetting quality results in a lower capacitance between the cathode surface and the electrolyte relative to a cathode which is readily wetted. This cathode to electrolyte capacitance is in series with the main capacitance between the electrolyte and anode. The over-all capacitance of an electrolytic capacitor is therefore lowered when the capacitance between the cathode and electrolyte is decreased due to an insufficient wetting of the silver by the electrolyte.

The metallic compounds identified above are all electrically conductive although their conductivities are of a decidedly lower order than the corresponding metal elements. The fact that they are conductive is important, as the metal compound layer or film upon the cathode surface is in the current path to the dielectric film on the anode and therefore should have a low resistance. To maintain desirable capacitor characteristics, it is important that the cathode film or layer be as thin as possible, and preferably no thicker than as recommended later. It is necessary that the cathode layer or film be substantially stable in the electrolyte.

It is to be noted that the compounds enumerated above are all substantially insoluble in the capacitor electrolyte under normal operating conditions.

The electrically conducting film or layer of metal compound on the cathode is very thin, in the order of dimensions up to a maximum of about 0.0001 inch. The preferred films have a thickness varying from molecular thickness to about 5000 angstrom units. The maximum thickness of the film or layer which may be used in accordance with my invention can be determined by the effects of the film on the capacitor. A polarized capacitor having a film of suitable thickness on the cathode will have a somewhat higher initial equivalent series resistance than the same polarized capacitor without treatment of the cathode. However, the treated capacitor, after use, soon changes so that its equivalent series resistance drops to about the initial resistance of the untreated capacitor. The untreated capacitor exhibits aging so that its initial resistance steadily increases. A treated capacitor having an excessively thick film of metal compound on the cathode does not exhibit the desired resistance decrease nor attain the desired low equivalent series resistance of the properly treated capacitor.

In practice, the desirable maximum film thickness may most conveniently be determined by sample treated capacitors having cathodes with films formed under known conditions.

The cathode is filmed by temporarily making the cathode the anode by applying a positive voltage to the cathode and providing a suitable electrolyte which includes ions which will combine with the cathode material to form the desired film. Thus, for example, in the case where it is desired to use a silver chloride film on the cathode, I have found that making the silver electrode the anode in an electrolyte containing chloride ions, a layer of silver chloride forms on the silver cathode. When the electrolyte of the assembled capacitor contains chloride ions, this silver chloride layer is formed after the capacitor is fabricated by applying a potential of reversed polarity from that normally applied to the capacitor. About 0.6 coulomb of electricity per square inch of silver surface has been found satisfactory for forming the desired thickness of silver chloride on a silver cathode.

This general procedure of obtaining a silver chloride film on metallic silver is used in making the so-called silver chloride electrode. (See, for example, page 409 of "Physical Chemistry," 1944 edition by Gucker and Meldrum.)

The quantity of electricity given above for depositing a silver chloride film on the metallic silver may be increased by as much as about 50% without producing an undesirably thick cathode film. A smaller quantity of electricity may be used effectively and still provide beneficial results. However, about 1 coulomb of electricity per square inch of silver surface is the maximum recommended.

It is understood that the above recommended quantities of electricity represent the useful energy. If the rate of current flow is excessive or if the voltage is excessive, some evolution of hydrogen may result. This represents a non-useful current flow which will not provide a satisfactory film on the cathode.

Correspondingly thin layers or films of gold and platinum chlorides and gold iodide may be obtained on the corresponding noble metal by well-known methods.

In order that the invention may be understood, it will now be explained in connection with the drawing, wherein a simple diagrammatic showing of a polarized capacitor embodying the present invention is illustrated. No attempt is made to show any mechanical details either as to the electrode structure or as to the nature of the housing for the capacitor. The cathode may or may not form the housing for the electrolyte.

Referring to the drawing, the anode is of a suitably formed metal or alloy previously mentioned as susceptible to use as a film-forming anode. It is understood that the material of which the anode is made must be insoluble in the electrolyte. As an example, the anode may be a spongy mass of tantalum, having a suitable film formed thereon, all this being well known in the art.

The electrolyte is an aqueous solution of lithium chloride or hydrochloric acid or a mixture of the two. The concentration may follow conventional practice and is susceptible to wide variation, depending upon desired characteristics. As an example, a 28% aqueous solution of lithium chloride is quite common. The electrolyte may have thickening agents, such as gelatine, added thereto if desired.

The capacitor has a cathode of any desired form and area. This cathode may either form the housing for the capacitor or may be immersed in the electrolyte and have no housing function for the capacitor. Generally, the cathode will consist of a sheet of noble metal having an extended surface contacted by the electrolyte, said metal being insoluble in the electrolyte. Of the noble metals of which the cathode may consist, silver is preferred because of its cheapness and availability, as well as because it may be fabricated easily and has excellent electrical conductivity. The other noble metals, such as platinum and gold, are generally equivalent to silver in the electrochemical consideration of the capacitor.

The capacitor includes a receptacle or housing either of the cathode metal or of separate material such as glass or other inert material. The finished capacitor may include a plug or seal of insulating material to seal the capacitor. Leads to the electrodes are provided.

The capacitor so far described is a conventional capacitor which, as has been previously pointed out, exhibits undesirable aging effects. In accordance with this invention, I provide a thin coating of silver chloride on the surface of the silver electrode. It is immaterial whether the silver chloride film is applied to the silver cathode prior to or subsequent to its incorporation as a cathode electrode in the polarized capacitor. The treated silver electrode may be handled in a conventional manner, including exposure to light. The darkening of the light-exposed film of silver chloride has no substantial effect on the characteristics of the capacitor.

It is understood that the thickness of the silver chloride film will be controlled as, for example, by control of the quantity of electricity used on the silver cathode when temporarily reversed to function as an anode. As previously pointed out, a preferred quantity of electricity is about 0.6 coulomb per square inch of silver surface to be treated, although as much as 1 coulomb may be used. The electrolyte has sufficient ions, both positive and negative, including chloride ions, to provide a low resistance path to the silver surface. The cooperating electrode, temporary cathode, will of course provide good electrical connection to the electrolyte.

As an example, the silver electrode (capacitor cathode) prior to its incorporation in the capacitor may be disposed in an aqueous solution of sodium chloride, or the chloride of any other alkali metal. A temporary cathode of any metal, including filmed metals such as tantalum and aluminum, is provided, and no more than the recommended quantity of electricity passed through in such direction that the silver electrode to be treated is temporarily an anode.

A simple treatment for an assembled preferred polarized capacitor of silver, tantalum, and an aqueous electrolyte of lithium chloride and/or hydrochloric acid, in accordance with the invention, is as follows: The capacitor is assembled in a normal manner with an untreated silver cathode and a filmed tantalum anode. The polarized capacitor may be sealed. Thereafter, the finished polarized capacitor is connected in a direct current treating circuit, the capacitor polarity being reversed. In other words, in the treating circuit the capacitor cathode is temporarily the anode, and the tantalum anode is temporarily the cathode. In the reverse direction, the film on the tantalum is conductive. No more than the recommended quantity of electricity is permitted to flow through the temporarily reversed capacitor. This forms a silver chloride layer on the silver electrode of the desired thickness. Then the capacitor is connected in circuit in a normal manner. It is immaterial when this is done.

The shelf life of the capacitor embodying the invention is in no way impaired. The polarized capacitor having the silver chloride film on the cathode may be used in a normal manner at any time.

As an example, polarized capacitors having filmed spongy tantalum anodes and silver cathodes in conventional 28% lithium chloride aqueous electrolyte with the silver treated on reverse current of about 0.6 coulomb per square inch of silver cathode surface showed the following improvements over the same untreated capacitors.

In a 1,000 hour accelerated life test, equivalent to from about 3 to about 10 years of normal use, the treated capacitors had no appreciable change in capacitance and increased in equivalent series resistance by 3.75%. Untreated capacitors after test showed a loss of 5.4% in capacitance and the equivalent series resistance increased by 10%.

By virtue of the treatment, shrinkage on a run of capacitors during manufacture may be greatly reduced if tolerances are close. Production yields have been increased as much as 40% by treatment as described above, even with close capacitor tolerances of plus or minus 5% capacitance values.

The term "equivalent series resistance" is well known and widely used to denote the excellence of a capacitor. This indicates the value of resistance in series, with a perfect capacitor having the same capacitance as a capacitor being considered which will duplicate the power factor of the capacitor being considered. (See, for example, Terman's 1943 edition of "Radio Engineers' Hand Book," pages 109 and 110.) It is clear that the better a condenser is, the lower will be its equivalent series resistance.

I claim:

1. A polarized capacitor substantially free of aging effects, said capacitor comprising a noble metal cathode, a filmed anode, an aqueous electrolyte containing predominantly chloride ions as negative ions, said cathode having thereon an adherent thin film of a compound of said noble metal, insoluble in the electrolyte, said compound being selected from the class consisting of the chlorides and iodides of the noble metals, said adherent film being thin enough so that the initial equivalent series resistance of the capacitor is higher than the capacitor without the adherent film, said equivalent series resistance dropping with capacitor use.

2. The capacitor according to claim 1 wherein the electrolyte is an aqueous solution of lithium chloride.

3. The capacitor according to claim 1 wherein the cathode is of silver and wherein the compound is silver chloride.

4. The capacitor according to claim 1 wherein the electrolyte is an aqueous solution of lithium chloride and wherein the cathode is of silver and the compound is silver chloride.

5. The capacitor according to claim 1 wherein the electrolyte is an aqueous solution of hydrochloric acid.

6. The capacitor according to claim 1 wherein the electrolyte is an aqueous solution of hydrochloric acid and wherein the cathode is of silver and the compound is silver chloride.

7. A polarized capacitor substantially free of aging effects, said capacitor comprising a silver cathode, a filmed tantalum anode, an aqueous solution of lithium chloride as electrolyte, said cathode having thereon an adherent thin film of silver chloride, said adherent film being thin enough so that the initial equivalent series resistance of the capacitor is higher than the capacitor without the adherent film, said equivalent series resistance dropping with capacitor use.

8. A polarized capacitor substantially free of aging effects, said capacitor comprising a silver cathode, a filmed tantalum anode, and an aqueous solution of lithium chloride as electrolyte, said cathode having thereon an adherent thin film of silver chloride formed by passing a current of no more than about 1 coulomb per square inch of silver surface in reverse direction through the capacitor.

9. A polarized capacitor substantially free of aging effects, said capacitor comprising a silver cathode, a filmed tantalum anode, an aqueous solution of lithium chloride as electrolyte, said cathode having thereon an adherent thin film of a silver halide, said adherent film being thin enough so that the initial equivalent series resistance of the capacitor is higher than the capacitor without the adherent film, said equivalent series resistance dropping with capacitor use.

10. A polarized capacitor substantially free of aging effects, said capacitor comprising a silver cathode, a filmed tantalum anode, an aqueous solution of lithium chloride as electrolyte, said cathode having thereon an adherent thin film of a silver halide selected from the class consisting of chlorides and iodides, said adherent film being thin enough so that the initial equivalent series resistance of the capacitor is higher than the capacitor without the adherent film, said equivalent series resistance dropping with capacitor use.

References Cited in the file of this patent

UNITED STATES PATENTS

| | | |
|---|---|---|
| 2,368,688 | Taylor | Feb. 6, 1945 |
| 2,521,082 | Mullen | Sept. 8, 1950 |
| 2,616,953 | Booe | Nov. 4, 1952 |
| 2,617,863 | Stinson | Nov. 11, 1952 |
| 2,710,369 | Booe | June 7, 1955 |